(12) United States Patent
Macaluso et al.

(10) Patent No.: US 7,804,673 B2
(45) Date of Patent: Sep. 28, 2010

(54) INTELLIGENT, SELF-AWARE POWERLINE CONDITIONING AND COMMUNICATION NODE

(76) Inventors: Michael Macaluso, 78 Forest Glen Dr., Highland Park, NJ (US) 08904; Oleg Logvinov, 27 Beacon Hill Rd., East Brunswick, NJ (US) 08816; Brion Ebert, 3547 Glen Ave., Easton, PA (US) 18045

(*) Notice: Subject to any disclaimer, the term of this patent is extended or adjusted under 35 U.S.C. 154(b) by 1390 days.

(21) Appl. No.: 11/244,694

(22) Filed: Oct. 6, 2005

(65) Prior Publication Data

US 2006/0072621 A1    Apr. 6, 2006

Related U.S. Application Data

(60) Provisional application No. 60/616,515, filed on Oct. 6, 2004, provisional application No. 60/570,154, filed on May 12, 2004.

(51) Int. Cl.
*H02H 9/00* (2006.01)
(52) U.S. Cl. ...................................... 361/119
(58) Field of Classification Search ............... 361/119, 361/115
See application file for complete search history.

(56) References Cited

U.S. PATENT DOCUMENTS 7,120,847 B2 * 10/2006 Kostoff et al. ............ 714/748

* cited by examiner

*Primary Examiner*—Stephen W Jackson

(57) ABSTRACT

Powerline networks are inherently noisy and subject to power surges, spikes, and other events. Devices exist to combat these issues and protect electrical appliances that are connected downstream from the power sources for theses devices, but these devices usually also severely limit data communication that may also be desired on this network. This invention provides an intelligent, self-aware powerline conditioning and communication node that allows for, or even improves, data communication on the network, and still provides for noise reduction, line filtering, and surge protection for downstream electrical appliances.

11 Claims, 1 Drawing Sheet

INTELLIGENT, SELF-AWARE POWERLINE CONDITIONING AND COMMUNICATION NODE

CROSS REFERENCE TO RELATED APPLICATIONS

This application claims the benefit of U.S. Provisional Application No. 60/616,515 filed Oct. 6, 2004, assigned to the assignee of this application and incorporated by reference herein. The present invention relates to the concepts and ideas expressed in U.S. Provisional Application No. 60/570,154 filed May 12, 2004, and subsequent U.S. Non-provisional application Ser. No. 11/128,498 filed May 12, 2005, assigned to the assignee of this application, and incorporated by reference herein. In particular, this invention is based on the concept expressed in claim 12 of these applications.

FIELD OF THE INVENTION

The present invention relates to a Powerline communication system for local area networks and wide area networks. In particular, this invention has uses in two areas: (1) a common power line access network that provides electricity to homes, businesses, and other entities, and (2) a common local power line network in a home, business or other environment. Both of these networks can be used to support communication between electronic appliances coupled to these lines. This invention has uses in such a system where both maximum communication coverage and line conditioning and device protection are desired.

BACKGROUND OF THE INVENTION

A common power transmission network can be viewed as having three (3) main segments. A distribution access network of medium voltage power lines, configured in a loop and several miles in length, connects a standard power substation to an area of homes and businesses. At various points on the loop, step down transformers provide a series of 110-240 V low voltage access lines, depending on the country, to a small number of homes and/or businesses. At the end of each one of these lines, a meter or meters is typically present for each electricity customer served by that line. On the other side of each meter is a typical in-home or in-building electricity distribution network, which is contained inside a home or business. It can be seen that all three of the network segments could possibly be used to transmit high-speed data across.

Powerline networks are inherently very noisy, and they are also susceptible to power surges, brownouts, and other events that may be detrimental to devices connected to it. Sophisticated communication methods have been developed to be able to mitigate and overcome the noise, so that high-speed communication is now possible. There are also devices that are available, and have been for a long time, that provide capabilities for surge protection, or line conditioning, or both. Unfortunately many of these devices, when connected to the powerline network, will cause data communication to be severely degraded, or not possible at all, when trying to communicate through these devices.

Therefore, it is desirable to have a device or system that will route the powerline communications signals around the surge protection and/or line conditioning device while still providing these features, that can improve, high-speed data communication on the network. Currently, Orthogonal Frequency Division Multiplexing (OFDM) based communication methods are available and used in various types of mediums, both wired and wireless. This method has inherent characteristics that make it well suited for dealing with noisy and changing environments, but any improvements in the communication channel that can be achieved through additional methods will improve communication quality and performance. Additionally, any device that can manage its own noise (i.e., is "self-aware"), further improves the communications performance.

SUMMARY OF THE INVENTION

This invention relates to fields where multiple systems and or devices are utilized for communication on a powerline network or to two different network segments and for transferring data information on a network or from one network to another. When connecting communication devices to these networks, it is desirable to connect in a manner that will: (1) not disrupt the characteristics of the network, (2) not add any additional noise or interference to the network from the device's own power supply or coupling devices, (3) condition the network to decrease the noise downstream and improve the transfer function upstream, and (4) provide surge protection to the communication device and other devices that may be connected downstream.

This invention looks to accomplish all those functions by the use of an intelligent, self-aware line conditioning and communication node that can be connected at virtually any point in the network In accordance with the present invention, this node provides the capability and the interface to provide high speed data communication capability utilizing, for example, Orthogonal Frequency Division Multiplexing (OFDM) based communication methods, and also provides functionality that filters out unwanted noise from, and provides surge protection for, itself and other devices that may be connected locally or downstream from where this node is connected to the network.

In a preferred embodiment, each communication node that is present in a given network would be comprised of an intelligent, self aware type as described above, wherein any endpoint noise generated by connected devices would be mitigated at the source point, thereby reducing the overall network noise considerably. It would reduce the noise generated by these endpoint devices, as well as any noise generated by the communication node itself, and also provide surge protection for these devices. All these factors would result in improving the communication network quality, transfer function, and available bandwidth, as well as providing protection for connected electrical devices.

BRIEF DESCRIPTION OF THE DRAWING

Other objects and advantages of the present invention will be apparent from the following detailed description of the accompanying drawing in which.

DETAILED DESCRIPTION OF THE INVENTION

Figure 1:
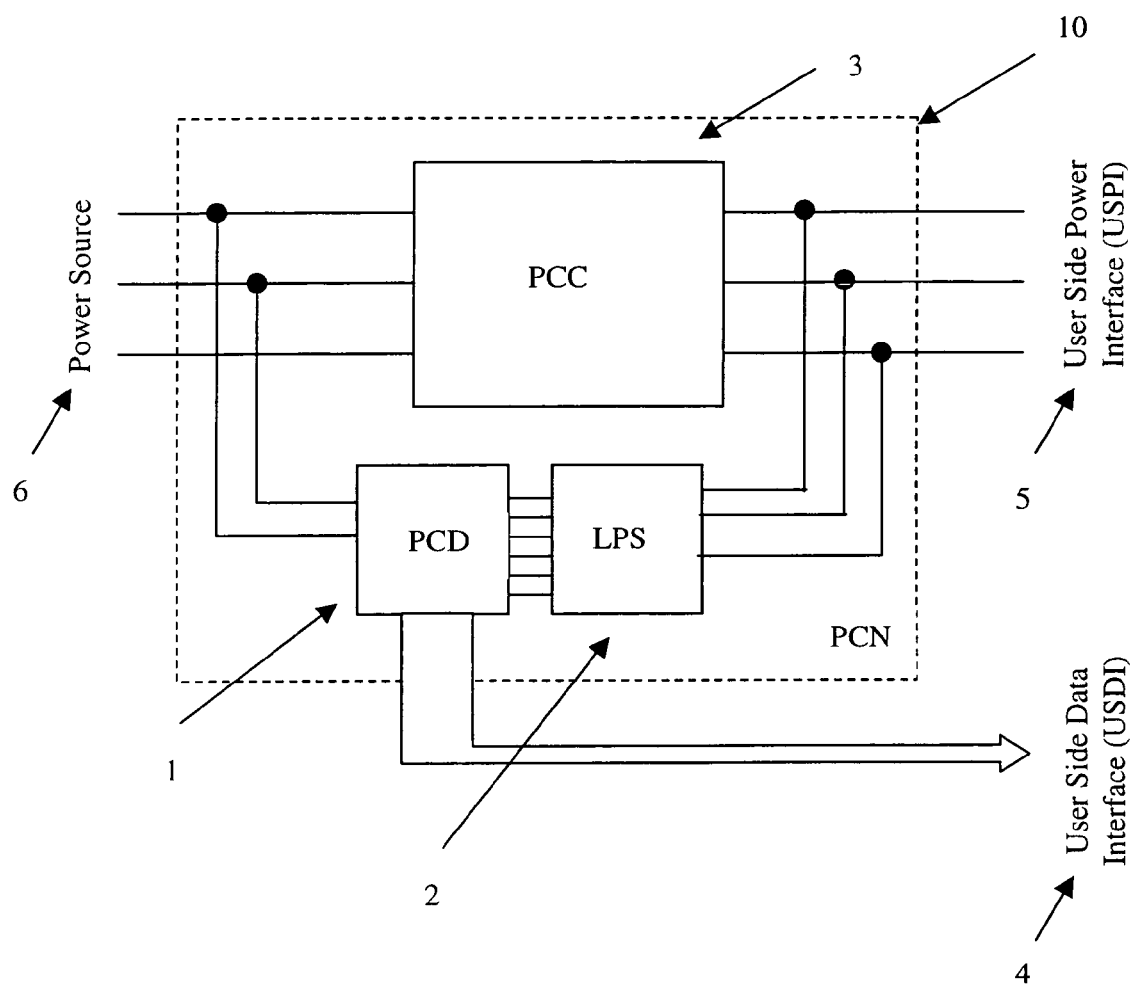
FIG. 1s a diagram of an exemplary powerline conditioning and communication node.

FIG. 1 illustrates an intelligent Powerline Communication Node (PCN) 10 in accordance with the present invention in which there exists a Powerline Communication Device (PCD) 1 with an associated Local Power Source (LPS) 2 and also contains a pass-through power feed that is further equipped with the Power Conditioning Circuit (PCC) 3. The powerline communication device 1 contains circuitry that allows it to connect to the power source side of the powerline network 6, and contains functionality that allows for data communication signals to be transmitted and received on the powerline, and converts these signals to data that is presented at the User Side Data Interface (USDI) 4. The power source 2 provides power to the powerline communication device 1 and derives its power from the User Side of the Power Interface (USPI) 5.

The power conditioning circuit 3 provides filtering functionalities to filter noise that may be present on the user interface side 5, and also helps to mitigate any impacts from the power source 2 on the data communication abilities. This power conditioning circuit 3 is also capable of improving the channel transfer function, where the channel is assumed to be the powerline network between device 10 and other respective communication devices connected at the different point of the powerline infrastructure.

This conditioning and communication node 10 can be implemented in a number of physical methods, and the benefits of this invention can be utilized in almost any location on the powerline network or networks. For example, this node could consist of a plug-in device, an in-wall outlet, a power strip, or a surge suppressor strip. The node could also be implemented as an in-line device, for location almost anywhere.

Although a preferred embodiment of the present invention has been described and illustrated, it will be apparent to those skilled in the art that various modifications may be made without departing from the principles of the invention.

What is claimed is:

1. A system comprising of a Powerline Communication Node (PCN), a Powerline Communication Device (PCD) with a Local Power Source (LPS), and further comprising a pass-through power feed that is further equipped with a Power Conditioning Circuit (PCC);

wherein the PDC and LPS form an electrical path around a PCC's Power Source side and a PCC's User Side Power Interface (USPI), thereby providing a bi-directional communications path around the PCC.

2. The system of claim 1, wherein the PCC is capable of filtering out noise from devices connected to the User Side Power Interface (USPI), preventing noise generated by them from reaching the supply side.

3. The system of claim 1, wherein the PCC is capable of improving the channel transfer function, wherein the channel is assumed to be the powerline between one respective PCN and another respective PCN connected at a different point of a powerline infrastructure.

4. The system of claim 1, wherein the PCC is capable of performing the functions described in claims 2 or 3.

5. The system of claim 1, wherein the PCN is implemented as a plug-in device.

6. The system of claim 1, wherein the PCN is implemented as an in-wall outlet.

7. The system of claim 1, wherein the PCN is implemented as a power strip.

8. The system of claim 1, wherein the PCN is implemented as a surge suppressor strip.

9. The system of claim 1, wherein the PCN is implemented as an in-line device.

10. The system of claim 1, wherein the PCN mitigates the impacts of the LPS.

11. The system of claim 1, wherein one of the devices is the LPS.

* * * * *